US012524236B2

United States Patent
Lee et al.

(10) Patent No.: US 12,524,236 B2
(45) Date of Patent: Jan. 13, 2026

(54) NEAR-MEMORY OPERATOR AND METHOD WITH ACCELERATOR PERFORMANCE IMPROVEMENT

(71) Applicant: Samsung Electronics Co., Ltd., Suwon-si (KR)

(72) Inventors: Gyeongmin Lee, Suwon-si (KR); Bongjun Kim, Suwon-si (KR); Seungwon Lee, Suwon-si (KR); Hanwoong Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 352 days.

(21) Appl. No.: 18/456,874

(22) Filed: Aug. 28, 2023

(65) Prior Publication Data

US 2024/0256277 A1 Aug. 1, 2024

(30) Foreign Application Priority Data

Jan. 26, 2023 (KR) ........................ 10-2023-0010405

(51) Int. Cl.
*G06F 9/30* (2018.01)
(52) U.S. Cl.
CPC ........ *G06F 9/3004* (2013.01); *G06F 9/30036* (2013.01)
(58) Field of Classification Search
CPC ............................ G06F 9/3004; G06F 9/30036
See application file for complete search history.

(56) References Cited

U.S. PATENT DOCUMENTS

| 10,817,587 B2 | 10/2020 | Redfern et al. |
| 11,443,014 B1 | 9/2022 | Wang et al. |
| 2020/0265167 A1* | 8/2020 | Banerjee ............... H04L 9/0631 |
| 2021/0081769 A1* | 3/2021 | Chen .................... G06F 15/7892 |
| 2021/0271630 A1 | 9/2021 | Koeplinger et al. |
| 2022/0197714 A1 | 6/2022 | Raumann et al. |
| 2022/0198117 A1 | 6/2022 | Raumann et al. |

(Continued)

FOREIGN PATENT DOCUMENTS

| KR | 10-2014-0131199 A | 11/2014 |
| KR | 10-2174335 B1 | 11/2020 |
| WO | WO 2022/133043 A1 | 6/2022 |

OTHER PUBLICATIONS

Extended European search report issued on Jun. 10, 2024, in counterpart European Patent Application No. 24153360.3 (11 pages).

(Continued)

*Primary Examiner* — Zachary K Huson
(74) *Attorney, Agent, or Firm* — NSIP Law

(57) ABSTRACT

A system configured to perform an operation includes: a hardware device comprising a plurality of computing modules and a plurality of memory modules arranged in a lattice form, each of the computing modules comprising a coarse-grained reconfigurable array and each of the memory modules comprising a static random-access memory and a plurality of functional units connected to the static random-access memory; and a compiler configured to divide a target operation and assign the divided target operation to the computing modules and the memory modules such that the computing modules and the memory modules of the hardware device perform the target operation.

20 Claims, 8 Drawing Sheets

(56) References Cited

U.S. PATENT DOCUMENTS

| | | |
|---|---|---|
| 2022/0309027 A1 | 9/2022 | Nama et al. |
| 2022/0405560 A1* | 12/2022 | Bae .................. G06F 7/5324 |
| 2023/0140309 A1* | 5/2023 | Oh .................. G06N 3/044 |
| | | 711/125 |

OTHER PUBLICATIONS

Zhang et al. "SARA: Scaling a Reconfigurable Dataflow Accelerator" *2021 ACM/IEEE 48th Annual International Symposium on Computer Architecture (ISCA)*. IEEE, 2021 (pp. 1-14).

\* cited by examiner

NEAR-MEMORY OPERATOR AND METHOD WITH ACCELERATOR PERFORMANCE IMPROVEMENT

CROSS-REFERENCE TO RELATED APPLICATIONS

This application claims the benefit under 35 USC § 119(a) of Korean Patent Application No. 10-2023-0010405, filed on Jan. 26, 2023 in the Korean Intellectual Property Office, the entire disclosure of which is incorporated herein by reference for all purposes.

BACKGROUND

1. Field

The following description relates to a near-memory operator and method with accelerator performance improvement.

2. Description of Related Art

A coarse-grained reconfigurable array (CGRA) may be used to accelerate an application, such as a high-performance computing (HPC) application, including a dataflow. The CGRA may include a plurality of functional units (FUs) arranged in a mesh structure. Each of the FUs may perform various operations, such as multiplication, addition, loading, and other program operations to be performed. A connection among the FUs may be reconfigurable and may thus be changed and used as needed. A compiler, by representing an application to be accelerated as a dataflow graph, may reconfigure the connection among the FUs configuring the CGRA at the time of compilation and assign an operation to each of the FUs.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one or more general aspects, a system configured to perform an operation includes: a hardware device comprising a plurality of computing modules and a plurality of memory modules arranged in a lattice form, each of the computing modules comprising a coarse-grained reconfigurable array and each of the memory modules comprising a static random-access memory and a plurality of functional units connected to the static random-access memory; and a compiler configured to divide a target operation and assign the divided target operation to the computing modules and the memory modules such that the computing modules and the memory modules of the hardware device perform the target operation.

For each of the memory modules, a functional unit comprised in the memory module may be individually connected to the static random-access memory of the memory module through a wire and configured to perform either one or both of an operation and a transmitting of a result of the operation to another functional unit comprised in the memory module.

The compiler may be configured to, in response to the target operation corresponding to a matrix multiplication operation between an input matrix and a weight matrix, tile each of the input matrix and the weight matrix to a length corresponding to the number of elements processible by one of the computing modules of the hardware device.

The compiler may be configured to: generate a plurality of big tiles by grouping a plurality of tiles comprised in the weight matrix by a total number of the computing modules comprised in the hardware device; and input each of a plurality of tiles comprised in one of the big tiles to one of the computing modules, input a plurality of tiles comprised in a partial matrix of the input matrix corresponding to the big tile to the computing modules, and control the computing modules such that the computing modules generate a plurality of partial sums corresponding to the big tile by assigning an element-wise multiplication operation to the computing modules.

The compiler may be configured to assign a reduction operation for summing two or more partial sums to the memory modules.

For the dividing the target operation and assigning the divided target operation, the compiler may be configured to divide the target operation into a plurality of sub-operations and assign each of the divided sub-operations to either one or both of the computing modules and the memory modules.

For the dividing the target operation and assigning the divided target operation, the compiler may be configured to: divide the target operation into a plurality of sub-operations; and for each of the divided sub-operations, assign the sub-operation to either one or both of the computing modules and the memory modules, based on determining whether the sub-operation corresponds to an input parallel.

For the assigning the sub-operation to either one or both of the computing modules and the memory modules, the compiler may be configured to: in response to the sub-operation corresponding to an input parallel, assign the sub-operation to the computing modules; and in response to the sub-operation not corresponding to an input parallel, assign the sub-operation either one or both of the computing modules and the memory modules, based on determining either one or both of whether the sub-operation is performable in a memory module and which module corresponds to the sub-operation by using a cost model.

For the assigning the sub-operation to either the computing modules or the memory modules, the compiler may be configured to: in response to the sub-operation being performable in a memory module and a module corresponding to the sub-operation being determined to be a memory module by using the cost model, assign the sub-operation to the memory modules; and in response to either one or both of the sub-operation not being performable in a memory module and a module corresponding to the sub-operation being determined to be a computing module by using the cost model, assign the sub-operation to the computing modules.

For the dividing the target operation and assigning the divided target operation, the compiler may be configured to determine computing modules of the computing modules to perform a second sub-operation of the sub-operations such that the second sub-operation that is dependent on a first sub-operation of sub-operations assigned to the memory modules and assigned to the computing modules is performed in computing modules that are adjacent to the memory modules configured to perform the first sub-operation.

In one or more general aspects, a processor-implemented method of performing an operation includes: dividing a target operation and assigning the divided target operation to a plurality of computing modules and a plurality of memory modules of a hardware device, such that the computing modules and the memory modules of the hardware device perform the target operation, wherein the computing modules and the memory modules are arranged in a lattice form, each of the computing modules comprises a coarse-grained reconfigurable array, and each of the memory modules comprises a static random-access memory and a plurality of functional units connected to the static random-access memory.

For each of the memory modules, a functional unit comprised in the memory module may be individually connected to the static random-access memory of the memory module through a wire and configured to perform either one or both of an operation and a transmitting of a result of the operation to another functional unit comprised in the memory module.

The method may include, in response to the target operation corresponding to a matrix multiplication operation between an input matrix and a weight matrix, tiling each of the input matrix and the weight matrix to a length corresponding to the number of elements processible by one of the computing modules of the hardware device.

The method may include: generating a plurality of big tiles by grouping a plurality of tiles comprised in the weight matrix by a total number of the computing modules comprised in the hardware device; and inputting each of a plurality of tiles comprised in one of the big tiles to of the computing modules, inputting a plurality of tiles comprised in a partial matrix of the input matrix corresponding to the big tile to the computing modules, and controlling the computing modules such that the computing modules generate a plurality of partial sums corresponding to the big tile by assigning an element-wise multiplication operation to the computing modules.

The method may include assigning a reduction operation for summing two or more partial sums to the memory modules.

The dividing the target operation and assigning the divided target operation may include: dividing the target operation into a plurality of sub-operations; and assigning each of the divided sub-operations to either one or both of the computing modules and the memory modules.

The dividing the target operation and assigning the divided target operation further may include: dividing the target operation into a plurality of sub-operations; and for each of the divided sub-operations, assigning the sub-operation to either one or both of the computing modules and the memory modules, based on determining whether the sub-operation corresponds to an input parallel.

The assigning the sub-operation to either one or both of the computing modules and the memory modules may include: in response to the sub-operation corresponding to an input parallel, assigning the sub-operation to the computing modules; and in response to the sub-operation not corresponding to an input parallel, assigning the sub-operation either one or both of the computing modules and the memory modules, based on determining either one or both of whether the sub-operation is performable in a memory module and which module corresponds to the sub-operation by using a cost model.

The assigning the sub-operation to either the computing modules or the memory modules further may include: in response to the sub-operation being performable in a memory module, and a module corresponding to the sub-operation is determined to be a memory module by using the cost model, assigning the sub-operation to the memory modules, and in response to either one or both of the sub-operation not being performable in a memory module and a module corresponding to the sub-operation is determined to be a computing module by using the cost model, assigning the sub-operation to the computing modules.

The dividing the target operation and assigning the divided target operation further may include determining computing modules to perform a second sub-operation such that the second sub-operation that is dependent on a first sub-operation assigned to the memory modules and assigned to the computing modules are performed in computing modules that are adjacent to the memory modules configured to perform the first sub-operation.

Other features and aspects will be apparent from the following detailed description, the drawings, and the claims.

Figure 1:
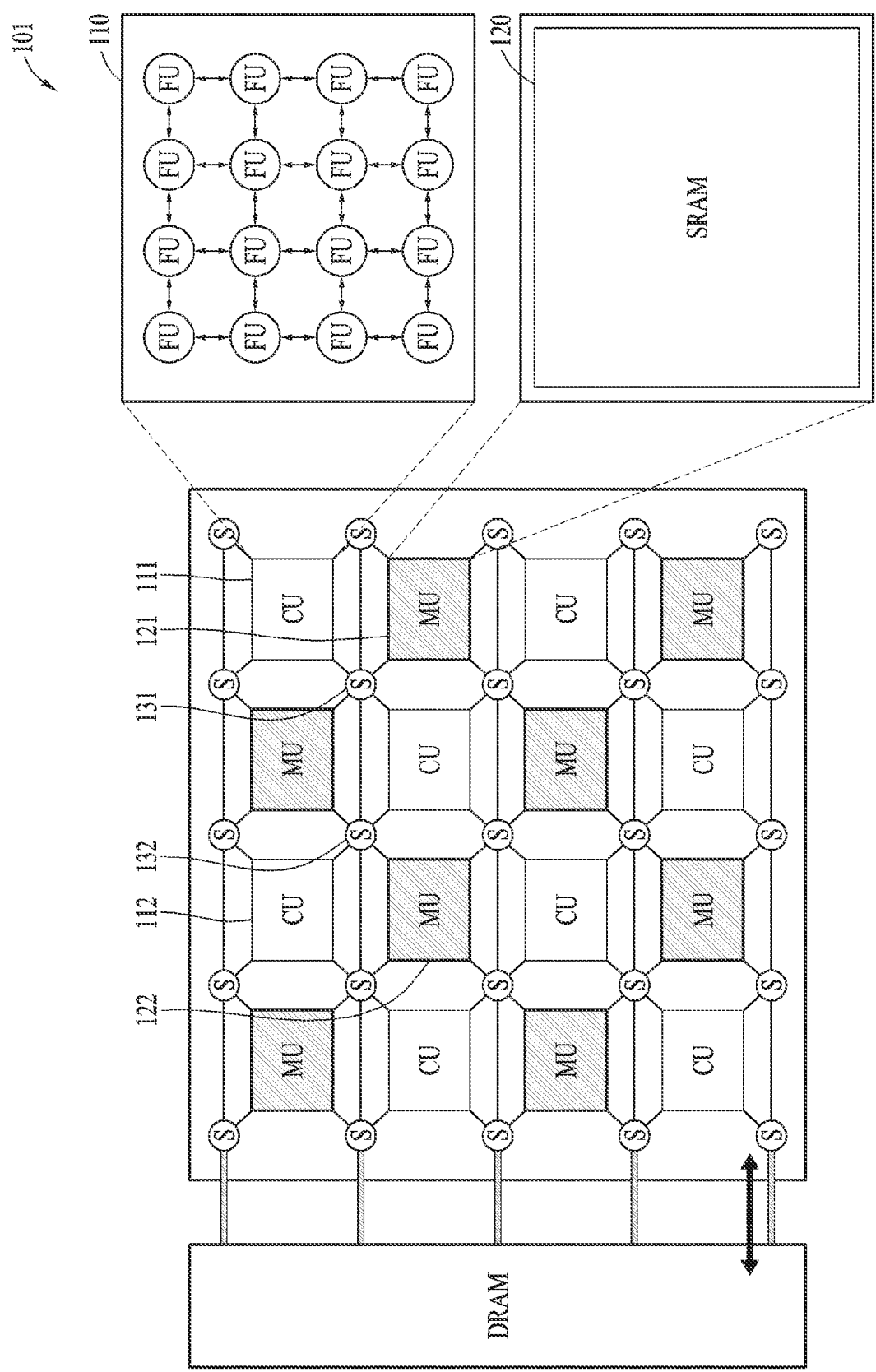
FIG. 1 illustrates an example of a structure of a reconfigurable dataflow accelerator (RDA).

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

Although terms, such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Throughout the specification, when a component or element is described as being "connected to," "coupled to," or "joined to" another component or element, it may be directly (e.g., in contact with the other component or element) "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning. The use of the term "may" herein with respect to an example or embodiment, e.g., as to what an example or embodiment may include or implement, means that at least one example or embodiment exists where such a feature is included or implemented, while all examples are not limited thereto.

Hereinafter, embodiments will be described in detail with reference to the accompanying drawings. When describing the embodiments with reference to the accompanying drawings, like reference numerals refer to like elements and a repeated description related thereto will be omitted.

FIG. 1 illustrates an example of a structure of a reconfigurable dataflow accelerator (RDA).

An application combining high-performance computing (HPC) with artificial intelligence (AI) implemented through a coarse-grained reconfigurable array (CGRA) 110 may not be readily accelerated. However, a reconfigurable dataflow accelerator (RDA) 101 including the CGRA 110 and a static random-access memory (SRAM) (120) may accelerate the HPC and AI combined application.

The RDA 101 may include a plurality of computing modules (e.g., a computing module 111 and a computing module 112) and a plurality of memory modules (e.g., a memory module 121 and a memory module 122). The computing modules and memory modules are hardware components and may be respectively referred to as computing units and memory units. A computing module (e.g., the computing module 111 and/or the computing module 112) configuring the RDA 101 may include the CGRA 110. A memory module (e.g., the memory module 121 and/or the memory module 122) configuring the RDA 101 may include the SRAM 120. For example, the SRAM 120 may be implemented as a scratchpad memory (SPM). The RDA 101 may have a structure of the computing modules and the memory modules arranged in a lattice form.

The RDA 101 may further include switches (e.g., a switch 131 and a switch 132) between the computing modules (e.g., the computing module 111 and the computing module 112) and the memory modules (e.g., the memory module 121 and the memory module 122). A switch may connect adjacent computing modules to one another, adjacent memory modules to one another, and a computing module to a memory module. A computing module may transmit and receive data to and from another computing module adjacent to the computing module or a memory module adjacent to the computing module through a switch. Likewise, a memory module may transmit and receive data to and from another memory module adjacent to the memory module or a computing module adjacent to the memory module through a switch.

A compiler of an electronic apparatus may analyze an application (e.g., an HPC and AI combined application) and determine an operation of the application to be assigned to computing modules included in an RDA (e.g., the RDA 101). The computing modules may perform the operation assigned by the compiler. The compiler may be, be implemented by, or be included in a processor of the electronic apparatus, where the electronic apparatus may include the RDA and the processor.

The compiler may control a plurality of functional units included in the CGRA 110 such that the CGRA 110 included in a computing module may process the operation assigned to the computing module. For example, the compiler may map the operation assigned to the computing module to the functional units included in the CGRA 110 and generate code to control the functional units by determining a connection structure between the functional units included in the CGRA 110.

The structure of the RDA 101 may have several issues in accelerating the HPC and AI combined application. The compiler may properly assign a complex dataflow to the computing modules included in the RDA 101 and the memory modules included in the RDA 101. A computing module configuring the RDA 101 may perform an operation assigned to the computing module by using data stored in a memory module adjacent to the computing module. A computing module may use a memory module to transmit a result of performing an operation to another computing module. For example, the computing module may transmit a result of performing the operation to the memory module adjacent to the computing module, and the memory module may transmit the result of performing the operation to another computing module. In this process, the compiler may use a heuristic configured to map a dataflow to each computing module and each memory module to minimize the use of the data of a memory module that is not adjacent to the computing module to optimize the performance of an accelerator. However, when the HPC and AI combined application includes an operation (e.g., matrix multiplication) that may be completely performed in parallel and a reduction operation in which an operation result calculated in a computing module is to be transmitted to a memory module that is not adjacent to the computing module, a typical compiler may not readily find an effective mapping method to optimize the performance of an RDA. In addition, when the HPC and AI combined application includes an accumulation operation in which the precision of output data is higher than the precision of input data, all the functional units included in the CGRA 110 may include an operator supporting high precision, which may not be advantageous in reducing a physical size or an occupied area of the accelerator.

Figure 2:
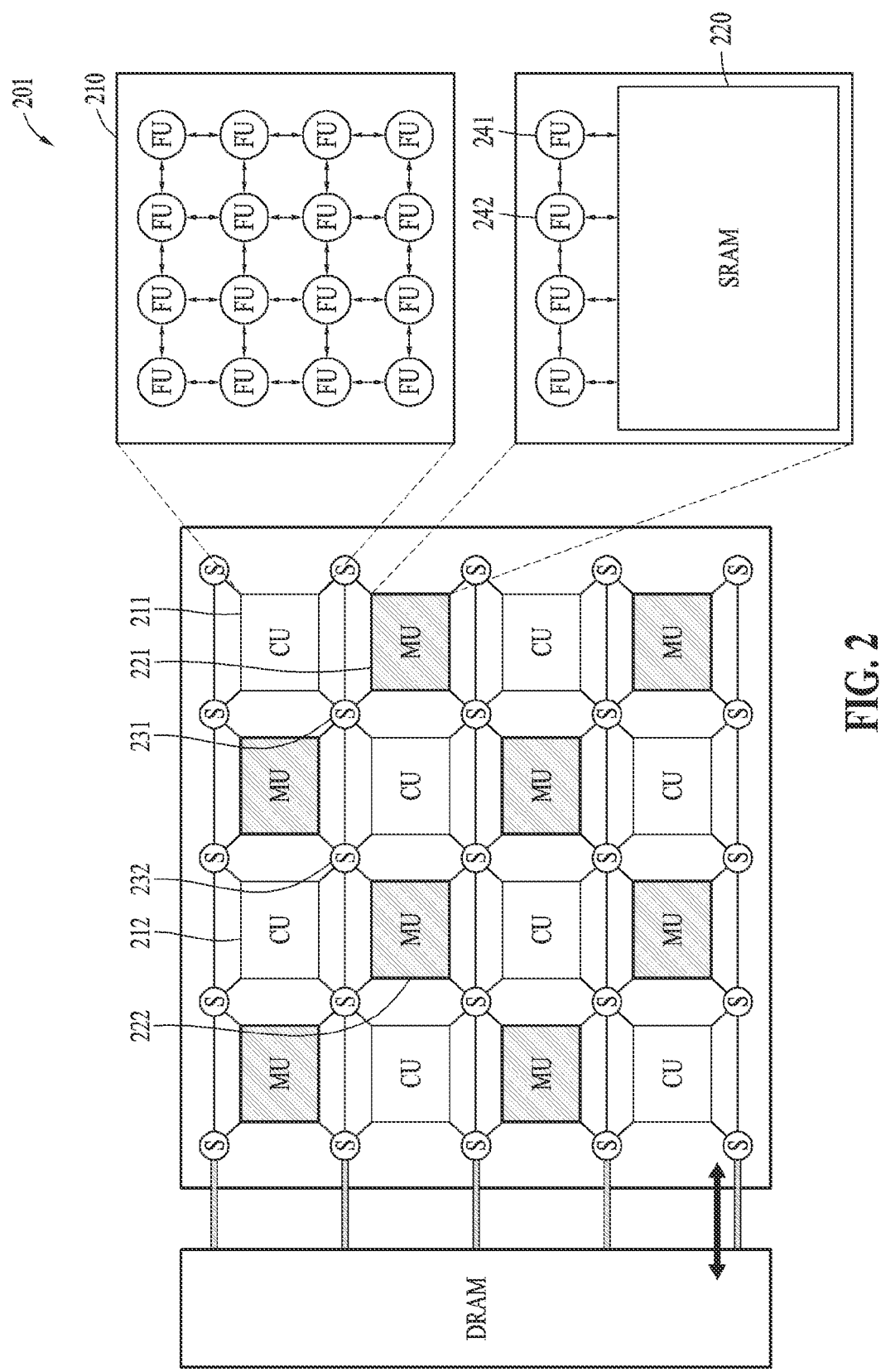
FIG. 2 illustrates an example of a structure of an RDA.

FIG. 2 illustrates an example of a structure of an RDA.

A system (e.g., an electronic apparatus 800 of FIG. 8) for performing an operation (hereinafter, an "operation performing system") may include a hardware device (e.g., a hardware device 805 of FIG. 8) and a compiler (e.g., implemented by and/or included in a processor 801 of FIG. 8). The hardware device may be an RDA 201. The compiler may divide a target operation and assign the divided target operation to a plurality of computing modules and a plurality of memory modules such that the computing modules and the memory modules configuring the hardware device perform the target operation.

In an embodiment, the RDA 201 may include the computing modules (e.g., a computing module 211 and a computing module 212) and the memory modules (e.g., a memory module 221 and a memory module 222). The RDA 201 may have a structure of a computing module including a CGRA 210 and a memory module including an SRAM 220 arranged in a lattice form.

In an embodiment, the CGRA 210 of the computing module may include a plurality of functional units in a mesh structure. Referring to FIG. 2, although an example of the CGRA 210 including 4×4 functional units is illustrated, examples are not limited thereto, and the CGRA 210 may include p×p functional units. Here, p may be a natural number greater than or equal to 2. A functional unit included in the CGRA 210 may be connected to other functional units through a wire.

In an embodiment, a memory module may include the SRAM 220 and a plurality of functional units (e.g., a functional unit 241 and a functional unit 242) connected to the SRAM 220. Referring to FIG. 2, although an example of the memory module including four functional units is illustrated, examples are not limited thereto, and the memory module may include t functional modules. Here, t may be a natural number greater than or equal to 2. Unlike a memory module configuring an RDA (e.g., the RDA 101 of FIG. 1), which does not include a functional unit, a memory module of one or more embodiments configuring the RDA 201 may include a plurality of functional units. Each of the functional units (e.g., the functional unit 241 and the functional unit 242) inside the memory module (e.g., the memory module 221) configuring the RDA 201 may be individually connected to an SRAM (e.g., the SRAM 220) through a wire. A functional unit inside the memory module configuring the RDA 201 may load data from the SRAM 220 or transmit the data to the SRAM 220 and may store the data. In addition, the functional unit inside the memory module configuring the RDA 201 may perform an operation and transmit a result of performing the operation to another functional unit. The functional unit inside the memory module configuring the RDA 201 may transmit or receive data to and from another memory module different from the memory module or a computing module through a network-on-chip (NOC).

In an embodiment, the RDA 201 may further include switches (e.g., a switch 231 and a switch 232) between the computing modules and the memory modules. As described with reference to FIG. 1, a switch may connect adjacent computing modules to one another, adjacent memory modules to one another, and a computing module to a memory module. A computing module may transmit and receive data to and from another computing module or a memory module through the switch. A memory module may transmit and receive data to and from another memory module or a computing module through the switch.

Figure 3:
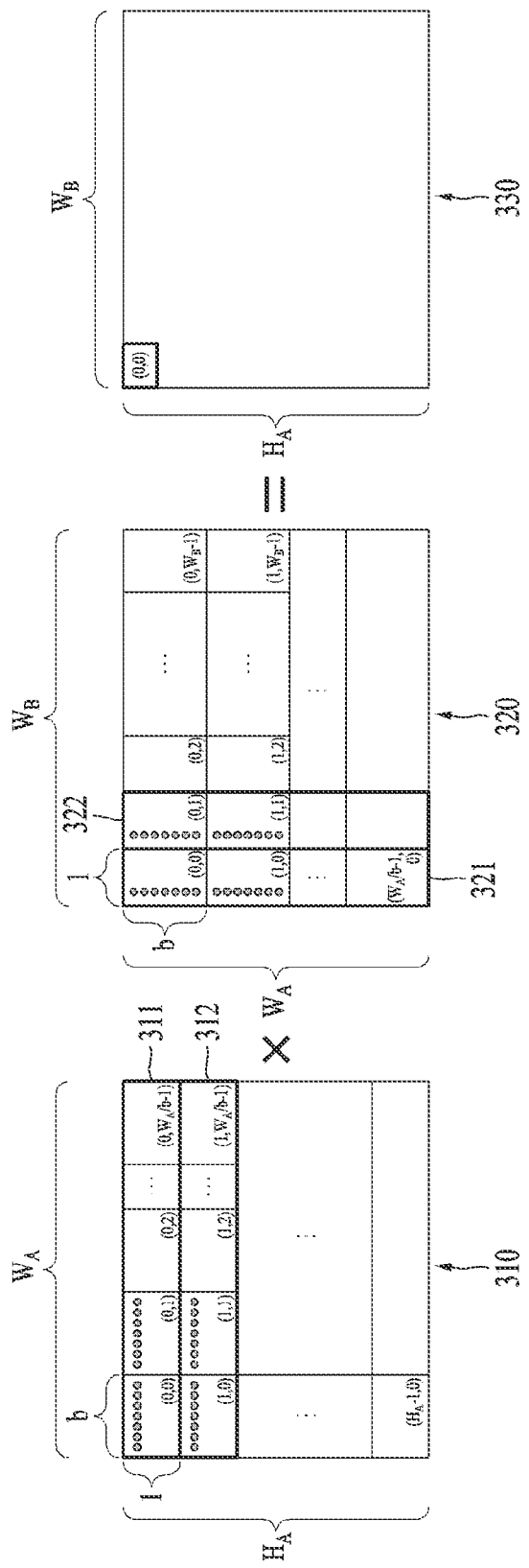
FIGS. 3, 4, and 5 illustrate examples of a process of performing a matrix multiplication operation among a plurality of matrices by using an RDA.
Figure 4:
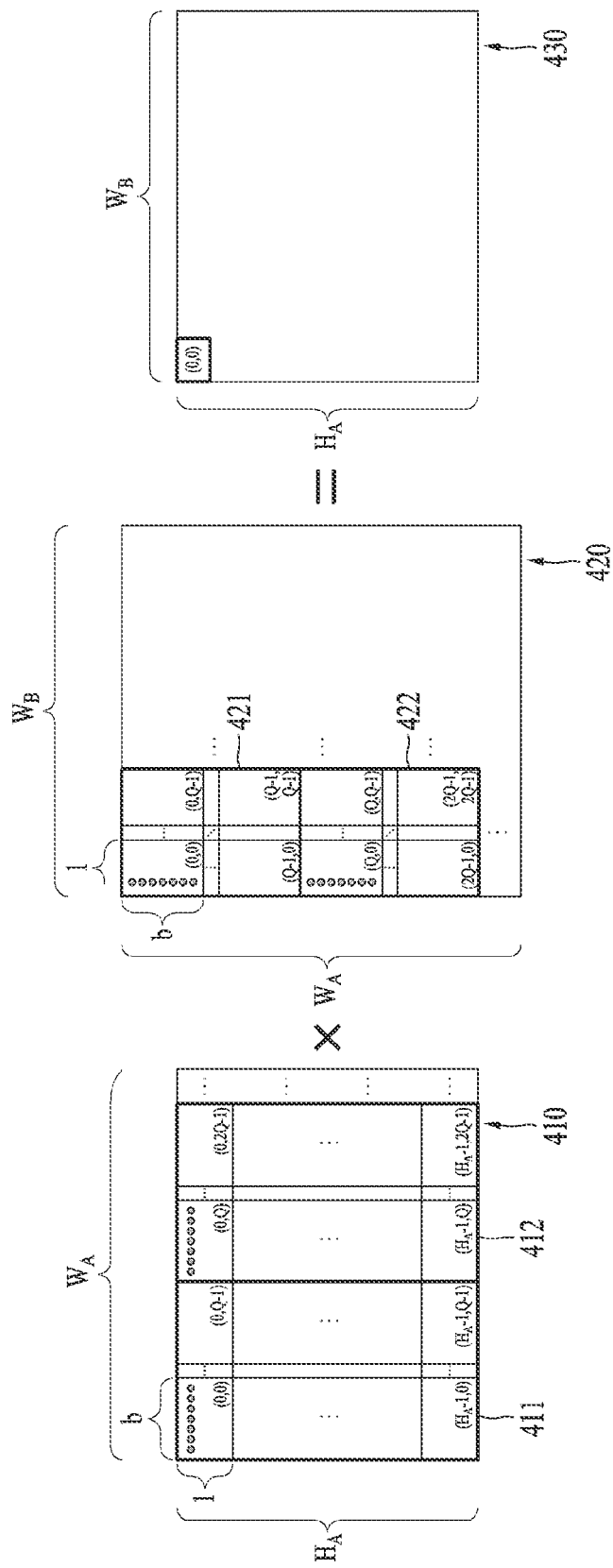
Figure 5:
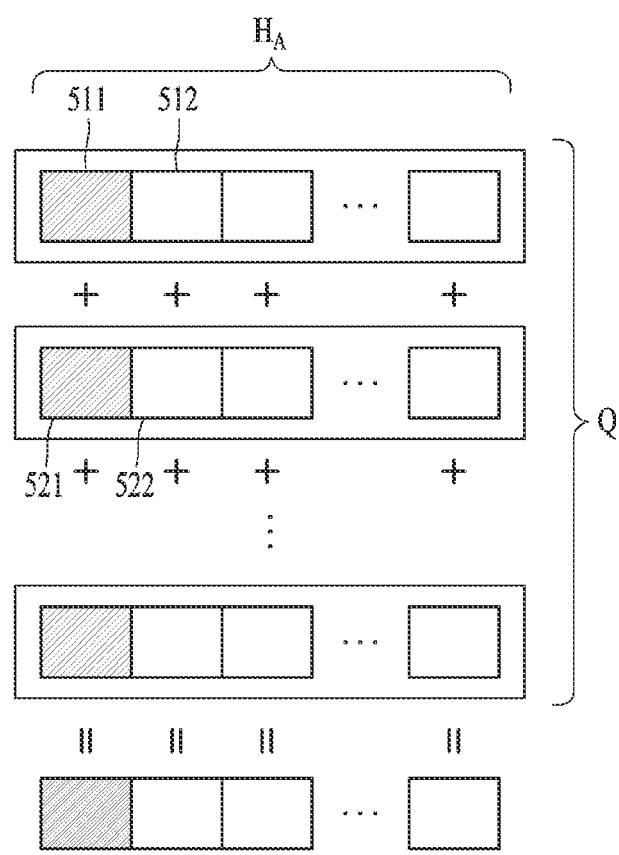

FIGS. 3, 4, and 5 illustrate examples of a process of performing a matrix multiplication operation among a plurality of matrices by using an RDA.

FIG. 3 is a diagram illustrating a process of tiling each of a plurality of matrices used for a matrix multiplication operation. According to one or more embodiments, an operation performing system may perform matrix multiplication by using a hardware device (e.g., the RDA 201 of FIG. 2) and a compiler (e.g., implemented by and/or included in a processor 801 of FIG. 8). An output matrix 330 may be calculated by an input matrix 310 and a weight matrix 320. An (i, j) element of the output matrix 330 may be a result of performing an operation according to a reduction operation and an element-wise multiplication operation of a i+1th row of the input matrix 310 and a j+1th column of the weight matrix 320. For example, a (0, 0) element of the output matrix 330 may be calculated according to a reduction operation and an element-wise multiplication operation of a first row 311 of the input matrix 310 and a first column 321 of the weight matrix 320. As another example, a (1, 1) element of the output matrix 330 may be calculated according to a reduction operation and an element-wise multiplication operation of a second row 312 of the input matrix 310 and a second column 322 of the weight matrix 320.

In an embodiment, when performing a matrix multiplication operation of the input matrix 310 and the weight matrix 320, the compiler may tile each of the input matrix 310 and the weight matrix 320 to a length corresponding to the number of elements that one computing module (e.g., the computing module 211 of FIG. 2) included in an RDA (e.g., the RDA 201 of FIG. 2) is configured to process (e.g., for a given operation). The compiler may tile the input matrix 310 in a first direction and the weight matrix 320 in a second direction orthogonal to the first direction. In this example, the first direction may be a row direction and the second direction may be a column direction. When the number of elements one computing module included in the RDA is configured to process is b, each tile generated in the input matrix 310 may include b elements in the first direction, and each tile generated in the weight matrix 320 may include b elements in the second direction. For example, the compiler may divide the input matrix 310 into a plurality of tiles of a 1×b size and the weight matrix 320 into a plurality of tiles of a b×1 size. For example, when the input matrix 310 is a matrix of an $H_A \times W_A$ size, each row of the input matrix 310 may be divided into $$\frac{W_A}{b}$$

tiles. As another example, when the weight matrix 320 is a matrix of a $W_A \times W_B$ size, each column of the weight matrix 320 may be divided into $$\frac{W_A}{b}$$

tiles.

In an embodiment, the compiler may assign an index to each of the tiles generated in the input matrix 310 and an index to each of the tiles generated in the weight matrix 320. The compiler may assign an index to each tile according to a relative position of the tiles included in the input matrix 310. For example, the compiler may set an index of a tile in an ith row and a jth column in the tiles generated in the input index 310 to (i−1, j−1). As another example, the compiler may set an index of a tile in an ith row and a jth column in the tiles generated in the weight matrix 320 to (i−1, j−1).

FIG. 4 is a diagram illustrating a process of assigning an element-wise multiplication operation to computing modules of the RDA by the compiler.

According to one or more embodiments, the compiler included in the operation performing system may enable the operation performing system to perform matrix multiplication in a weight-stationary method of moving elements of an input matrix 410 (e.g., the input matrix 310 of FIG. 3) to the computing modules of the RDA (e.g., the RDA 201 of FIG. 2) and input the elements while fixing elements of a weight matrix 420 (e.g., the weight matrix 320 of FIG. 3) to the computing modules of the RDA. For example, the weight-stationary method may be a method of moving each of tiles included in the input matrix 410 from a computing module on the leftmost side to a computing module on the rightmost side and input the tiles after fixing each of tiles included in the weight matrix 420 to the computing modules of the RDA. However, when less than all the tiles included in the weight matrix 420 are fixed to each of the computing modules included in the RDA due to the limited hardware of the RDA, the compiler may group the tiles included in the weight matrix 420 by the number of computing modules included in the RDA. The compiler may generate a plurality of big tiles (e.g., grouped tiles) based on grouping the tiles included in the weight matrix 420 by the number of the computing modules included in the RDA. One big tile may include the same number of tiles as the number of the computing modules included in the RDA.

For example, the number of the computing modules included in the RDA may be a total of $Q^2(Q \times Q)$. In this case, the compiler may group the tiles included in the weight matrix 420 into $Q^2(Q \times Q)$ tiles and generate the big tiles (e.g., a big tile 421 and a big tile 422).

In an embodiment, the compiler may perform matrix multiplication on each of the big tiles with one partial matrix included in the input matrix 410 for matrix multiplication between the input matrix 410 and the weight matrix 420. The compiler may identify a partial matrix (e.g., a partial matrix 411) in the input matrix 410 corresponding to one big tile (e.g., the big tile 421) included in the weight matrix 420. The partial matrix (e.g., the partial matrix 411) in the input matrix 410 corresponding to the big tile (e.g., the big tile 421) may be a matrix including tiles in the input matrix 410 on which matrix multiplication is to be performed with tiles included in the big tile (e.g., the big tile 421) for the matrix multiplication between the input matrix 410 and the weight matrix 420.

In an embodiment, the partial matrix (e.g., the partial matrix 411) in the input matrix 410 corresponding to the big tile (e.g., the big tile 421) may be a matrix including tiles included in the input matrix 410 including, as a column element of an index, the same value as one of row elements of indexes of the tiles included in the big tile (e.g., the big tile 421) in the weight matrix 420. For example, the partial matrix 411 in the input matrix 410 corresponding to the big tile 421 included in the weight matrix 420 may be a matrix including the tiles included in the input matrix 410 including, as a row element of an index, the same value as one of column elements (e.g., 0, 1, 2, . . . , Q−1) of the indexes of the tiles included in the big tile 421. As another example, a partial matrix 412 in the input matrix 410 corresponding to the big tile 422 included in the weight matrix 420 may be a matrix including the tiles included in the input matrix 410 including, as a column element of an index, the same value as one of row elements (e.g., Q, Q+1, . . . , 2Q−1) of indexes of tiles included in the big tile 422.

In an embodiment, the compiler may input each of the tiles included in the big tile (e.g., the big tile 421) to a separate computing module included in the RDA and input a plurality of tiles included in a partial matrix (e.g., the partial matrix 411) in the input matrix 410 corresponding to the big tile (e.g., the big tile 421) to the computing modules included in the RDA. For example, the compiler may input tiles having an index of (k, 0) included in the partial matrix 411 to a computing module to which a tile of which an index is (0, 0) included in the big tile 421. Here, k may be a natural number greater than or equal to 0 and less than or equal to $H_A - 1$.

The compiler may control the computing modules to generate a plurality of partial sums corresponding to the big tile (e.g., the big tile 421) by assigning an element-wise multiplication operation to the computing modules included in the RDA. The computing modules may transmit the generated partial sums to a plurality of memory modules and store the generated partial sums in the memory modules.

FIG. 5 is a diagram illustrating a process of the compiler controlling a plurality of computing modules such that the computing modules generate a plurality of partial sums based on matrix multiplication between a big tile and a partial matrix corresponding to the big tile.

According to one or more embodiments, the compiler may control the computing modules to generate the partial sums based on matrix multiplication between the big tile (e.g., the big tile 421 of FIG. 4) and a partial matrix (e.g., the partial matrix 411 of FIG. 4) in an input matrix (e.g., the input matrix 410 of FIG. 4). For example, the big tile may include $Q^2(Q \times Q)$ tiles. Here, Q may be a natural number greater than or equal to 2.

Referring to FIG. 4, the compiler may control the computing modules configuring the RDA such that the computing modules generate a plurality of partial sums based on matrix multiplication between the big tile 421 and the partial matrix 411 corresponding to the big tile 421. The compiler may control the computing modules to generate Q partial sums by performing an element-wise multiplication operation between tiles included in a first row of the partial matrix 411 and tiles included in an mth column of the big tile 421. Here, m may be a natural number greater than or equal to 1 and less than or equal to Q. For example, the computing modules may generate one partial sum by performing an element-wise multiplication operation between the tiles included in the first row of the partial matrix 411 and tiles included in a first column of the big tile 421. As another example, the computing modules may generate one partial sum by performing an element-wise multiplication operation between the tiles included in the first row of the partial matrix 411 and tiles included in a second column of the big tile 421.

The performing of an element-wise multiplication operation between tiles may be the performing of element-wise multiplication between elements included in one tile and elements included in another tile corresponding to the tile by each tile. Referring to FIG. 5, the Q partial sums generated by the computing modules may be grouped into a first partial sum group 511 for the big tile 421.

Likewise, the compiler may control the computing modules to generate Q partial sums by performing an element-wise multiplication operation between tiles included in a second row of the partial matrix 411 and the tiles included in the mth column of the big tile 421. The Q partial sums may be grouped into a second partial sum group 512 for the big tile 421.

In this example, the compiler may control the computing modules to generate a total of $H_A$ partial sum groups (e.g., the first partial sum group 511 for the big tile 421 and the second partial sum group 512 for the big tile 421) through matrix multiplication between each of $H_A$ rows included in the partial matrix 411 and the big tile 421 corresponding to the partial matrix 411.

In an embodiment, the compiler may perform matrix multiplication for another big tile (e.g., the big tile 422) that is adjacent to the big tile (e.g., the big tile 421) and positioned in the second direction with respect to the big tile subsequently after performing all the matrix multiplication for the big tile. For example, the compiler may perform matrix multiplication between the big tile 422 and the partial matrix 412 corresponding to the big tile 422 subsequently after performing all the matrix multiplication for the big tile 421. The compiler may control the computing modules to generate Q partial sums by performing an element-wise multiplication operation between tiles included in a first row of the partial matrix 412 and tiles included in an mth column of the big tile 422. The generated Q partial sums may be grouped into a first partial sum group 521 for the big tile 422. The compiler may control the computing modules to generate Q partial sums by performing an element-wise multiplication operation between tiles included in a second row of the partial matrix 412 and the tiles included in the mth column of the big tile 422. The Q partial sums may be grouped into a second partial sum group 522 for the big tile 422. In this method, the compiler may control the computing modules to generate a total of $H_A$ partial sum groups (e.g., the first partial sum group 521 for the big tile 422 and the second partial sum group 522 for the big tile 422) through matrix multiplication between each of $H_A$ rows included in the partial matrix 412 and the big tile 422 corresponding to the partial matrix 412.

Then, the compiler may perform matrix multiplication for another big tile that is adjacent to the big tile 422 and positioned in the second direction with respect to the big tile 422 subsequently after performing all the matrix multiplication for the big tile 422 in the RDA. The compiler may perform all the matrix multiplication for all the other big tiles included in the same column as the column of the big tile (e.g., the big tile 421 or the big tile 422) in the RDA.

The compiler may sum two or more partial sums to calculate an element included in an output matrix (e.g., the output matrix 430 of FIG. 4). For example, to calculate a (0, 0) element of the output matrix (e.g., the output matrix 430), an element-wise multiplication operation between a first row of an input matrix (e.g., the input matrix 410) and a first column of a weight matrix (e.g., the weight matrix 420) may be performed. Accordingly, the compiler may sum a first partial sum for the big tile 421 calculated through an element-wise multiplication operation between the tiles included in the first row of the partial matrix 411 and the tiles included in the first column of the big tile 421 and a first partial sum for the big tile 422 calculated through an element-wise multiplication operation between the tiles included in the first row of the partial matrix 412 and tiles included in the first column of the big tile 422. In addition to a summed value, the compiler may calculate the (0, 0) element of the output matrix 430 by additionally summing partial sums calculated through an element-wise multiplication operation between tiles included in a first row of a partial matrix corresponding to a big tile and tiles included in a first column of the big tile for each of other big tiles positioned in the second direction (the column direction) with respect to the big tile 421 or the big tile 422 in the weight matrix 420.

In an embodiment, the compiler may calculate and sum two or more partial sums to calculate one element of the output matrix 430.

In the process of calculating each of the two or more partial sums, the compiler may assign an element-wise multiplication operation to the computing modules included in the RDA. The computing modules included in the RDA may calculate a partial sum by performing an element-wise multiplication operation and may transmit the calculated partial sum to a memory module and store the calculated partial sum in the memory module.

In the process of summing the two or more partial sums, the compiler may assign a reduction operation to the memory modules included in the RDA.

When a memory module (e.g., the memory module 121 of FIG. 1) does not include a functional unit in the structure of a typical RDA (e.g., the RDA 101 of FIG. 1), a separate computing module may be additionally required to sum the two or more partial sums. For example, although the two or more partial sums may be stored in the memory module to calculate one element configuring the output matrix 430 in the structure of the RDA (e.g., the RDA 101 of FIG. 1), the memory module may have to transmit the two or more partial sums to the computing module again because the memory module included in the typical RDA (e.g., the RDA 101 of FIG. 1) may not perform a reduction operation. The computing module, by performing a reduction operation of summing the two or more partial sums received from the memory module and transmitting a result of performing the reduction operation to the memory module again, may calculate the element configuring the output matrix 430. In summary, an operation speed may decrease when a memory module transmits partial sums to a computing module, and the computing module performs a reduction operation and transmits a result of performing the reduction operation to the memory module again in the structure of the typical RDA (e.g., the RDA 101 of FIG. 1).

In contrast, according to another example, as a memory module (e.g., the memory module 221 of FIG. 2) of an RDA (e.g., the RDA 201 of FIG. 2) of one or more embodiments includes a plurality of functional units, a separate computing module to sum a plurality of partial sums may not be additionally required in the structure of the RDA. For example, in the structure of the RDA (e.g., the RDA 201 of FIG. 2) of one or more embodiments, two or more partial sums may be stored in the memory module to calculate one element configuring the output matrix 430, and the memory module may immediately perform a reduction operation of summing the two or more partial sums. That is, the compiler may assign the reduction operation of summing the two or more partial sums to the memory module to calculate the element of the output matrix 430. Since the memory module of the RDA of one or more embodiments may sum the partial sums by using the functional units in the memory module, an operation speed in the RDA may be accelerated.

Figure 6:
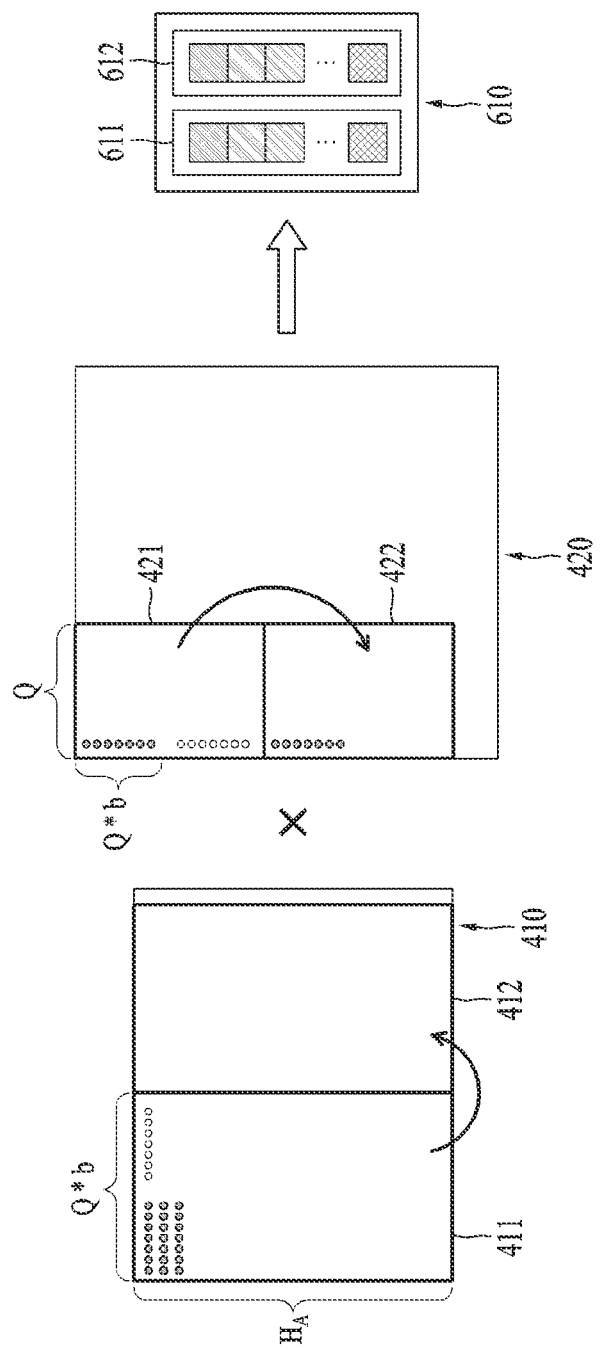
FIG. 6 illustrates an example of a process of performing a reduction operation in an RDA.

FIG. 6 illustrates an example of a process of performing a reduction operation in an RDA.

According to one or more embodiments, a compiler may load a big tile 421 and calculate a plurality of partial sums 611 related to the big tile 421. The compiler may store the partial sums 611 related to the big tile 421 in a memory module 610 (e.g., the memory module 221 of FIG. 2). Then, the compiler may load a big tile 422 that is adjacent to the big tile 421 and positioned in a second direction (e.g., a column direction) with respect to the big tile 421. The compiler may load the big tile 422 and calculate a plurality of partial sums 612 related to the big tile 422. The compiler may store the partial sums 612 related to the big tile 422 in the memory module 610.

In an embodiment, the compiler may control the memory module 610 to perform a reduction operation and update a cumulative sum stored in the memory module 610. For example, when receiving one partial sum calculated for the big tile 421, the memory module 610 may store the received partial sum as a cumulative sum. When receiving one partial sum calculated for the big tile 422 that is loaded after the big tile 421, the memory module 610 may update the cumulative sum by summing the partial sum calculated for the big tile 422 and the cumulative sum. In this method, every time a big tile is loaded, the memory module 610 may update the cumulative sum by summing a partial sum calculated for the loaded big tile and the cumulative sum. The memory module 610 may update the cumulative sum until all the other big tiles (e.g., the big tile 422) positioned in the same column direction as the big tile 421 are loaded.

Since a memory module configuring the RDA of one or more embodiments includes a functional unit, the reduction operation may be performed without assigning an additional computing module, and the memory module itself may perform the reduction operation. When computing modules configuring the RDA perform an element-wise multiplication operation while memory modules are performing the reduction operation, the element-wise multiplication operation and the reduction operation may be separately performed in the RDA. In addition, when the memory module configuring the RDA is to receive a calculated partial sum from the computing modules to perform the reduction operation, the element-wise multiplication operation and the reduction operation may overlap with each other.

Figure 7:
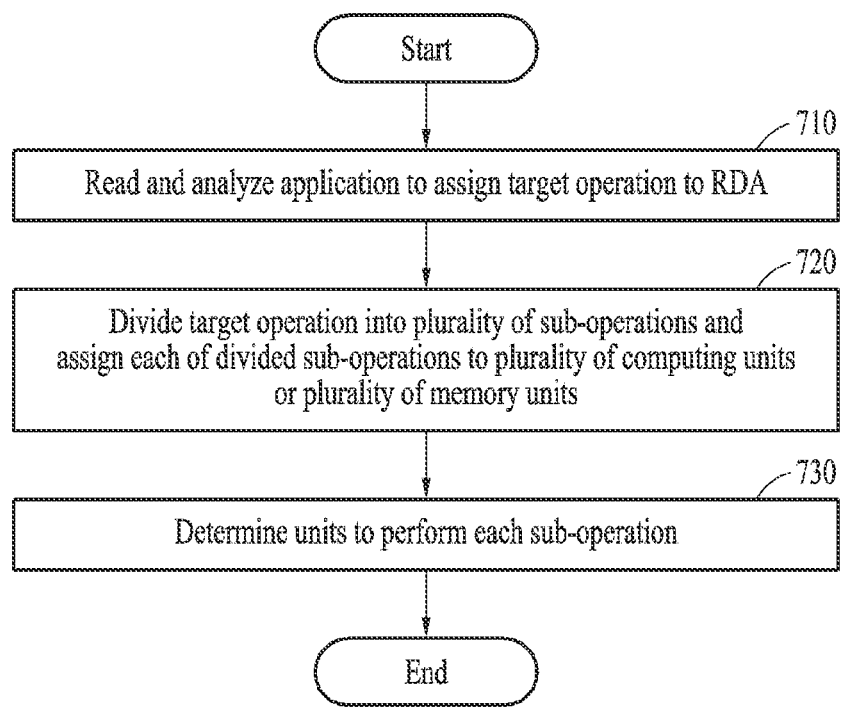
FIG. 7 illustrates an example of a process of assigning a target operation to a plurality of computing modules and a plurality of memory modules by a compiler.

FIG. 7 illustrates an example of a process of assigning a target operation to a plurality of computing modules and a plurality of memory modules by a compiler.

According to one or more embodiments, a compiler may divide the target operation into a plurality of sub-operations and assign each of the divided sub-operations to the computing modules or the memory modules included in an RDA (e.g., the RDA 201 of FIG. 2). Hereinafter, the process of the compiler dividing the target operation and assigning the target operation to the computing modules and the memory modules included in the RDA is described in detail.

In operation 710, the compiler may read and analyze an application to assign the target operation to the RDA (e.g., the RDA 201 of FIG. 2).

The compiler may extract code of the target operation to be accelerated and necessary information for optimization through the analysis of the application. The necessary information for optimization may include, for example, dependence between data to be input and an operation to be performed, a dataflow between operations, the types of input data and output data, the size of data, or the type of an operation, and examples are not limited thereto. The compiler may extract the code of the target operation to be accelerated and the necessary information for optimization by using various analyses, such as a program dependence graph analysis (PDG analysis), an Alias analysis, or a hot loop extraction.

In operation 720, the compiler may divide the target operation into the sub-operations and assign each of the divided sub-operations to the computing modules or the memory modules.

In an embodiment, the compiler may divide the target operation into the sub-operations. The compiler may determine whether the sub-operations included in the target operation correspond to an input parallel, based on the analysis of an input pattern of the target operation. The input parallel may be a loop pattern tiled in a parallel form. For example, the compiler may determine whether a sub-operation has a loop pattern tiled in a parallel form.

The compiler may assign the sub-operation to either the computing modules or the memory modules, based on the determining of whether the sub-operation is an input parallel.

In an embodiment, when the sub-operation corresponds to an input parallel, the compiler may assign the sub-operation to the computing modules. When the sub-operation does not correspond to an input parallel, the compiler may assign the sub-operation either the computing modules or the memory modules, based on the determining of whether the sub-operation is performable in a memory module or which module corresponds to the sub-operation by using a cost model.

According to one or more embodiments, since a memory module configuring the RDA (e.g., the RDA 201 of FIG. 2) includes a functional unit, the memory module may perform a reduction operation, an addition operation, an accumulation operation, a data type conversion operation, a multiplication operation, or the like. However, the memory module configuring the RDA may not perform an operation of a special function, such as a conditional branch operation or an exponentiation operation. For example, when a sub-operation is a reduction operation, the compiler may determine that the sub-operation is performable in the memory module.

The cost model may be a model for predicting the time to be consumed to complete an operation assigned to hardware. The cost model may be, for example, a machine learning model. When an operation and the structure of a hardware device is input to the cost model, the cost model may predict a performing time when the operation is performed by computing modules included in the hardware device and a performing time when the operation is performed by memory modules included in the hardware device. The compiler may obtain a first performing time and a second performing time, in which the first performing time is a performing time predicted when an operation is performed by the computing modules included in the hardware device and the second performing time is a performing time predicted when the operation is performed by the memory modules included in the hardware device by inputting the operation and the hardware device to the cost model. The compiler may determine that a module corresponding to the operation is a computing module in response to the first performing time being less than the second performing time. The compiler may determine a module corresponding to the operation is a memory module in response to the first performing time being greater than the second performing time.

In an embodiment, when a sub-operation is performable in a memory module, and a module corresponding to the sub-operation is determined to be a memory module by using the cost model, the compiler may assign the sub-operation to the memory modules. As described above, the compiler may obtain the first performing time and the second performing time, in which the first performing time is a performing time predicted when a sub-operation is performed by the computing modules and the second performing time is a performing time predicted when the sub-operation is performed by the memory modules by inputting the sub-operation and the hardware device to the cost model, and determine a module corresponding to the sub-operation based on comparing the first performing time and the performing time. In an embodiment, when the sub-operation is not performable in a memory module, or a module corresponding to the sub-operation is determined to be a computing module by using the cost model, the compiler may assign the sub-operation to the computing modules.

In this method, the compiler may assign each of the sub-operations divided from the target operation to either the computing modules or the memory modules included in the RDA (e.g., the RDA 201 of FIG. 2).

In operation 730, the compiler may determine modules to perform each sub-operation. For example, the compiler may determine a physical device (e.g., a computing module or a memory module) to actually perform each sub-operation. In this case, the compiler may determine modules to perform a sub-operation according to a dataflow. In an embodiment, the compiler may determine computing modules to perform a second sub-operation such that the second sub-operation that is dependent on a first sub-operation assigned to the memory modules and assigned to the computing modules are performed in computing modules that are adjacent to the memory modules configured to perform the first sub-operation. In this method, the compiler may minimize communication between the memory modules.

Figure 8:
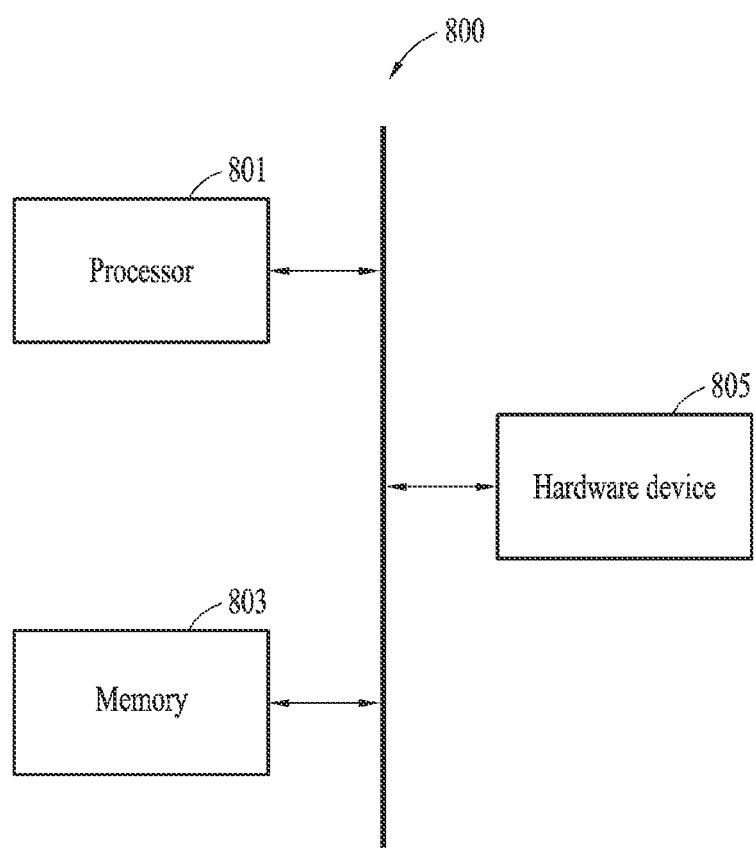
FIG. 8 illustrates an example of an electronic apparatus.

FIG. 8 illustrates an example of an electronic apparatus.

Referring to FIG. 8, an electronic apparatus 800 may include a processor 801 (e.g., one or more processors), a memory 803 (e.g., one or more memories), and a hardware device 805.

The processor 801 may implement and/or include any or all of the compilers described herein with reference to FIGS. 1-7. The processor 801 may perform any one, any combination, or all of the operations and methods of the compilers described herein with reference to FIGS. 1-7.

The memory 803 may be a volatile or non-volatile memory For example, the memory 803 may be or include a non-transitory computer-readable storage medium storing instructions that, when executed by the processor 801, configure the processor 801 to perform any one, any combination, or all of the operations and methods of the compilers described herein with reference to FIGS. 1-7. The memory 803 may store instructions corresponding to a target operation to be divided by the processor 801 and assigned by the processor 801 to the hardware device 805.

The hardware device 805 may be or include an RDA (e.g., the RDA 201 of FIG. 2). For example, the hardware device 805 may include one or more computing modules and one or more memory modules arranged in a lattice form, where each computing module includes a coarse-grained reconfigurable array and each memory module includes a static random-access memory and a plurality of functional units connected to the static random-access memory.

The electronic apparatus 800 may further include other components not shown in the drawings. For example, the electronic apparatus 800 may further include an input/output interface including an input device and an output device as means for interfacing with the hardware device 805. In another example, the apparatus 800 may further include other components, such as a transceiver, various sensors, and a database.

The RDAs, CGRAs, SRAMs, computing modules, memory modules, switches, electronic apparatuses, processors, memories, RDA 101, CGRA 110, SRAM 120, computing module 111, computing module 112, memory module 121, memory module 122, switch 131, switch 132, RDA 201, CGRA 210, SRAM 220, computing module 211, computing module 212, memory module 221, memory module 222, switch 231, switch 232, electronic apparatus 800, processor 801, memory 803 and a hardware device 805 and other apparatuses, devices, units, modules, and components disclosed and described herein with respect to FIGS. 1-7 are implemented by or representative of hardware components. As described above, or in addition to the descriptions above, examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. As described above, or in addition to the descriptions above, example hardware components may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media, and thus, not a signal per se. As described above, or in addition to the descriptions above, examples of a non-transitory computer-readable storage medium include one or more of any of read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above and all drawing disclosures, the scope of the disclosure is also inclusive of the claims and their equivalents, i.e., all variations within the scope of the claims and their equivalents are to be construed as being included in the disclosure.

What is claimed is:

1. A system configured to perform an operation, the system comprising:
   a hardware device comprising a plurality of computing modules and a plurality of memory modules arranged in a lattice form, each of the computing modules comprising a coarse-grained reconfigurable array and each of the memory modules comprising a static random-access memory and a plurality of functional units connected to the static random-access memory; and
   a compiler configured to divide a target operation and assign the divided target operation to the computing modules and the memory modules such that the computing modules and the memory modules of the hardware device perform the target operation.

2. The system of claim 1, wherein, for each of the memory modules, a functional unit comprised in the memory module is individually connected to the static random-access memory of the memory module through a wire and configured to perform either one or both of an operation and a transmitting of a result of the operation to another functional unit comprised in the memory module.

3. The system of claim 1, wherein the compiler is configured to, in response to the target operation corresponding to a matrix multiplication operation between an input matrix and a weight matrix, tile each of the input matrix and the weight matrix to a length corresponding to the number of elements processible by one of the computing modules of the hardware device.

4. The system of claim 3, wherein the compiler is further configured to:

generate a plurality of big tiles by grouping a plurality of tiles comprised in the weight matrix by a total number of the computing modules comprised in the hardware device; and input each of a plurality of tiles comprised in one of the big tiles to one of the computing modules, input a plurality of tiles comprised in a partial matrix of the input matrix corresponding to the big tile to the computing modules, and control the computing modules such that the computing modules generate a plurality of partial sums corresponding to the big tile by assigning an element-wise multiplication operation to the computing modules.

5. The system of claim 4, wherein the compiler is further configured to assign a reduction operation for summing two or more partial sums to the memory modules.

6. The system of claim 1, wherein, for the dividing the target operation and assigning the divided target operation, the compiler is further configured to divide the target operation into a plurality of sub-operations and assign each of the divided sub-operations to either one or both of the computing modules and the memory modules.

7. The system of claim 1, wherein, for the dividing the target operation and assigning the divided target operation, the compiler is further configured to:

divide the target operation into a plurality of sub-operations; and for each of the divided sub-operations, assign the sub-operation to either one or both of the computing modules and the memory modules, based on determining whether the sub-operation corresponds to an input parallel.

8. The system of claim 7, wherein, for the assigning the sub-operation to either one or both of the computing modules and the memory modules, the compiler is further configured to:

in response to the sub-operation corresponding to an input parallel, assign the sub-operation to the computing modules; and in response to the sub-operation not corresponding to an input parallel, assign the sub-operation either one or both of the computing modules and the memory modules, based on determining either one or both of whether the sub-operation is performable in a memory module and which module corresponds to the sub-operation by using a cost model.

9. The system of claim 8, wherein, for the assigning the sub-operation to either the computing modules or the memory modules, the compiler is further configured to:

in response to the sub-operation being performable in a memory module and a module corresponding to the sub-operation being determined to be a memory module by using the cost model, assign the sub-operation to the memory modules; and in response to either one or both of the sub-operation not being performable in a memory module and a module corresponding to the sub-operation being determined to be a computing module by using the cost model, assign the sub-operation to the computing modules.

10. The system of claim 6, wherein, for the dividing the target operation and assigning the divided target operation, the compiler is further configured to determine computing modules of the computing modules to perform a second sub-operation of the sub-operations such that the second sub-operation that is dependent on a first sub-operation of sub-operations assigned to the memory modules and assigned to the computing modules is performed in computing modules that are adjacent to the memory modules configured to perform the first sub-operation.

11. A processor-implemented method of performing an operation, the method comprising:

dividing a target operation and assigning the divided target operation to a plurality of computing modules and a plurality of memory modules of a hardware device, such that the computing modules and the memory modules of the hardware device perform the target operation, wherein the computing modules and the memory modules are arranged in a lattice form, each of the computing modules comprises a coarse-grained reconfigurable array, and each of the memory modules comprises a static random-access memory and a plurality of functional units connected to the static random-access memory.

12. The method of claim 11, wherein, for each of the memory modules, a functional unit comprised in the memory module is individually connected to the static random-access memory of the memory module through a wire and configured to perform either one or both of an operation and a transmitting of a result of the operation to another functional unit comprised in the memory module.

13. The method of claim 11, further comprising, in response to the target operation corresponding to a matrix multiplication operation between an input matrix and a weight matrix, tiling each of the input matrix and the weight matrix to a length corresponding to the number of elements processible by one of the computing modules of the hardware device.

14. The method of claim 13, further comprising:

generating a plurality of big tiles by grouping a plurality of tiles comprised in the weight matrix by a total number of the computing modules comprised in the hardware device; and inputting each of a plurality of tiles comprised in one of the big tiles to of the computing modules, inputting a plurality of tiles comprised in a partial matrix of the input matrix corresponding to the big tile to the computing modules, and controlling the computing modules such that the computing modules generate a plurality of partial sums corresponding to the big tile by assigning an element-wise multiplication operation to the computing modules.

15. The method of claim 14, further comprising assigning a reduction operation for summing two or more partial sums to the memory modules.

16. The method of claim 11, wherein the dividing the target operation and assigning the divided target operation comprises:

dividing the target operation into a plurality of sub-operations; and assigning each of the divided sub-operations to either one or both of the computing modules and the memory modules.

17. The method of claim 11, wherein the dividing the target operation and assigning the divided target operation further comprises:

dividing the target operation into a plurality of sub-operations; and for each of the divided sub-operations, assigning the sub-operation to either one or both of the computing modules and the memory modules, based on determining whether the sub-operation corresponds to an input parallel.

18. The method of claim 17, wherein the assigning the sub-operation to either one or both of the computing modules and the memory modules comprises:
- in response to the sub-operation corresponding to an input parallel, assigning the sub-operation to the computing modules; and
- in response to the sub-operation not corresponding to an input parallel, assigning the sub-operation either one or both of the computing modules and the memory modules, based on determining either one or both of whether the sub-operation is performable in a memory module and which module corresponds to the sub-operation by using a cost model.

19. The method of claim 18, wherein the assigning the sub-operation to either the computing modules or the memory modules further comprises:
- in response to the sub-operation being performable in a memory module, and a module corresponding to the sub-operation is determined to be a memory module by using the cost model, assigning the sub-operation to the memory modules, and
- in response to either one or both of the sub-operation not being performable in a memory module and a module corresponding to the sub-operation is determined to be a computing module by using the cost model, assigning the sub-operation to the computing modules.

20. The method of claim 16, wherein the dividing the target operation and assigning the divided target operation further comprises determining computing modules to perform a second sub-operation such that the second sub-operation that is dependent on a first sub-operation assigned to the memory modules and assigned to the computing modules are performed in computing modules that are adjacent to the memory modules configured to perform the first sub-operation.

* * * * *